Figure 5:
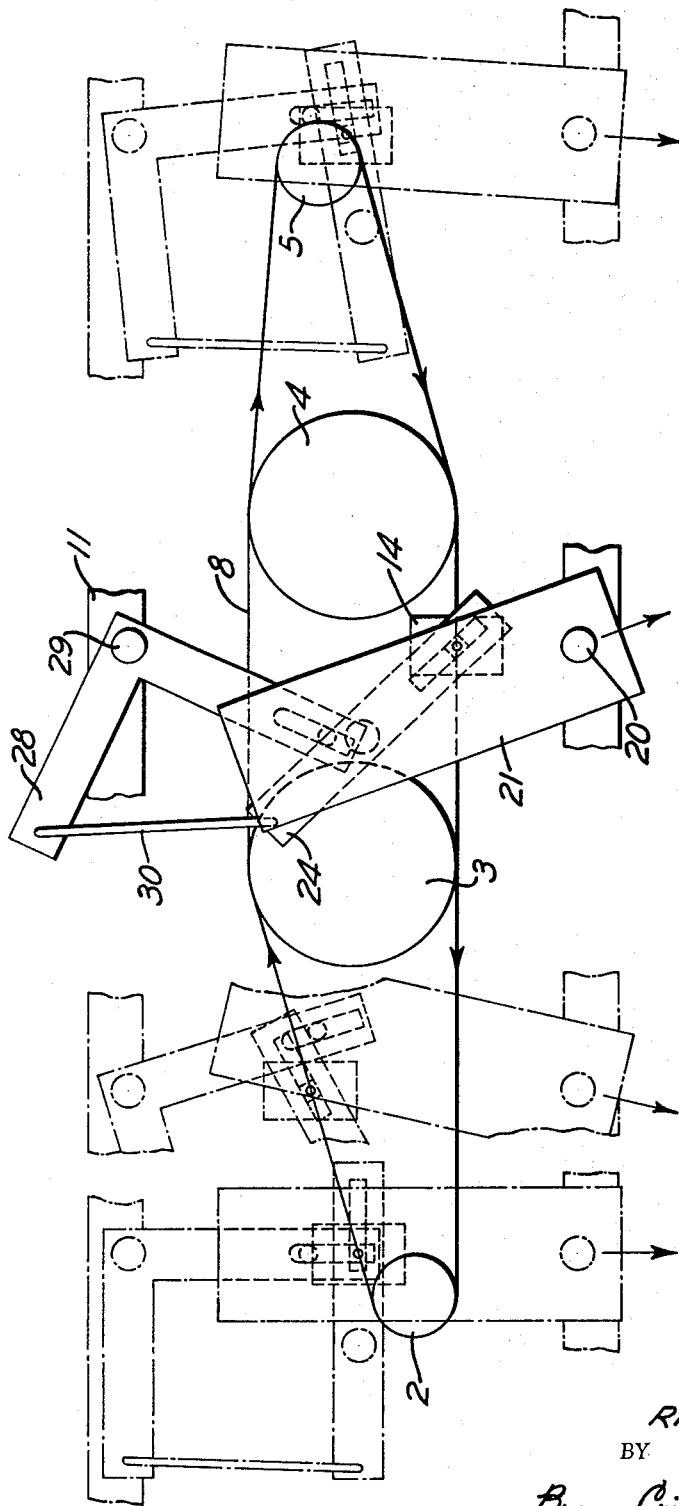

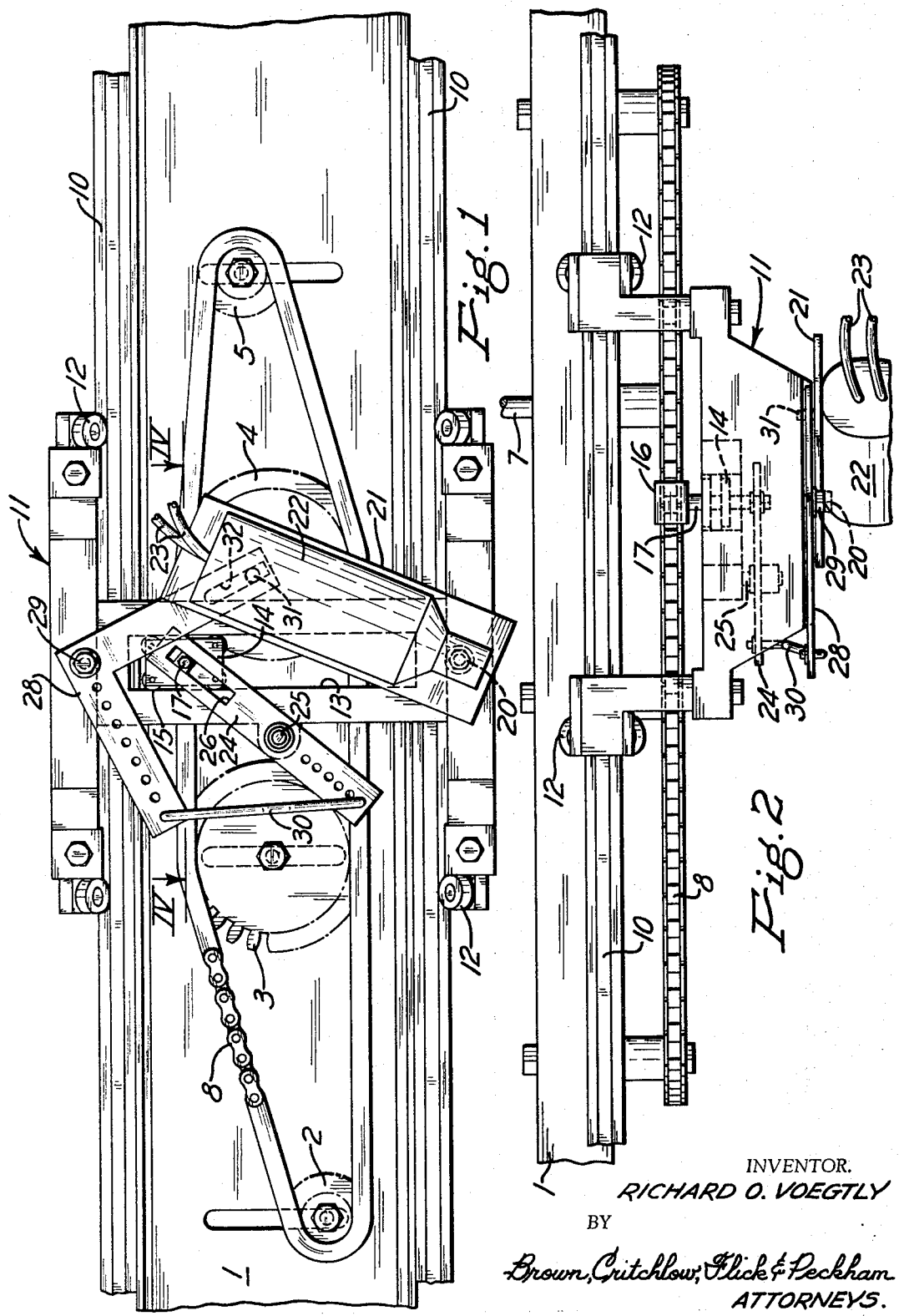

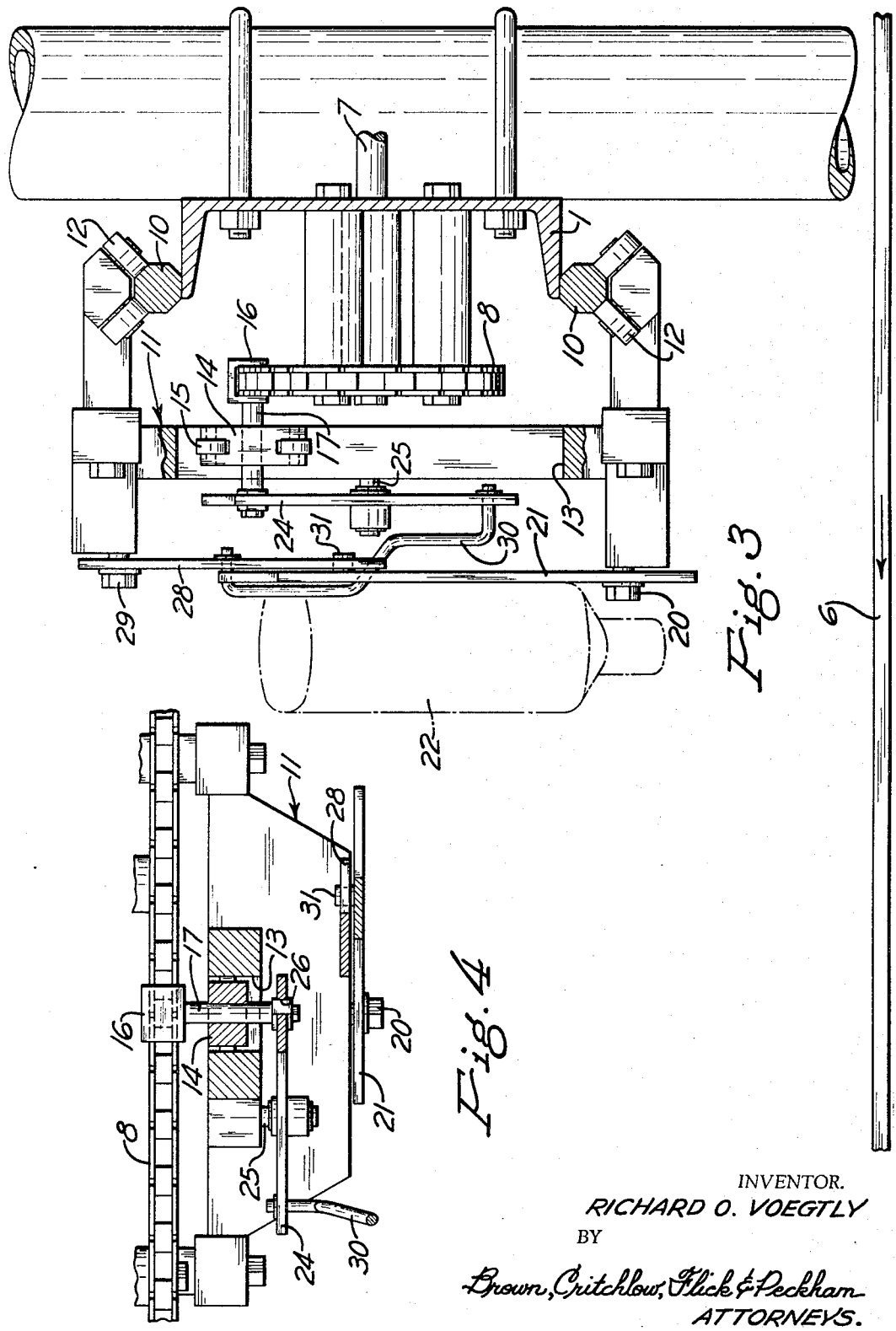

INVENTOR.
RICHARD O. VOEGTLY

United States Patent Office 3,383,046
Patented May 14, 1968

---

3,383,046
SPRAY COATING APPARATUS
Richard O. Voegtly, Harmony, Pa., assignor to Callery Chemical Company, Callery, Pa., a corporation of Pennsylvania
Filed Dec. 2, 1966, Ser. No. 598,732
8 Claims. (Cl. 239—186)

This invention relates to apparatus for spraying a coating on a substrate, and more particularly to apparatus for spraying a coating of controlled irregular thickness.

It is common practice to place a substrate, such as a sheet of metal or paperboard or the like, on a conveyor that carries it beneath a spray gun which is moved back and forth across the sheet by means of an endless traveling chain that reciprocates a carriage on which the spray gun is mounted. Often the gun is pivotally mounted so that it can be inclined in one direction as it moves across the substrate and then, when it approaches the end of its path, be turned in the opposite direction for the return trip. Most machines of this type are designed to apply a coating of uniform thickness to the substrate. The coating may be any desired material, but frequently is polyurethane which foams to a uniform thickness and then sets. Sheets provided with such a coating can be used for thermal and acoustical insulation. For some applications, it is desirable that the coating on the sheets not be the same thickness throughout its width. In other cases, where uniform thickness is desired and the sheet is provided with longitudinal corrugations or ribs, an ordinary spray coating machine such as described above will not maintain the thickness of the coating uniform where it passes over the raised portions of the sheet.

It is among the objects of this invention to provide apparatus for spraying on a substrate a coating, the thickness of which can be controlled and deliberately varied over different areas of the substrate.

In accordance with this invention, an endless chain, supported by sprockets, extends lengthwise of a track that generally is horizontal. One of the sprockets is driven for moving the chain continuously at a uniform speed. A carriage is mounted on the track and means is provided for connecting the chain with the carriage for moving it back and forth along the track. The carriage pivotally supports an arm that can swing lengthwise of the track and that in turn supports a spray gun for spraying a coating on an underlying substrate. There is a lever, a pivot connecting the lever to the carriage, and means pivotally connecting the chain with the lever to turn the lever on its pivot as the position of the pivotally connecting means relative to the pivot changes. Suitable means operatively connect the lever with the arm to swing the arm as the lever turns. The arm therefore will tilt the spray gun in one direction as it moves across a substrate being sprayed, and will tilt it in the opposite direction as the spray gun returns across the substrate. In order to vary the thickness of the coating, the angle of the spray gun is controlled. This is accomplished by disposing different straight portions of at least one of the two spaced lengths of the chain at different angles to the path of travel of the carriage so that the gun will aim at a given area of the substrate for a longer time than at other areas.

The preferred embodiment of the invention is illustrated in the accompanying drawings, in which FIG. 1 is a front view of the spraying apparatus;
FIG. 2 is a plan view thereof;
FIG. 3 is an end view, partly in vertical section;
FIG. 4 is a fragmentary horizontal section taken on the line IV—IV of FIG. 1; and
FIG. 5 is a diagrammatic front view showing the carriage in different positions.

Referring to FIGS. 1 to 4 of the drawings, a suitable framework is provided that includes a channel 1 supporting at least three sprockets on parallel axes. Four such sprockets 2, 3, 4 and 5 are shown in the drawings. Preferably, these are disposed in a vertical transverse plane of the framework above a conveyor 6 (FIG. 3) for the substrate that is to be coated. At least one, and preferably three, of the sprockets can be adjusted vertically on the channel. One of the sprockets is driven through a shaft 7 by a constant speed drive not shown. An endless chain 8 extends around all of the sprockets and thereby forms a loop extending across the machine. It will be understood that some of the sprockets actually could be toothless if desired.

Mounted behind the chain is a horizontal track, preferably formed from upper and lower rails 10 supported by the transverse channel 1. A carriage 11 is mounted on the track to travel back and forth on the rails. The body of this carriage may be located in front of the chain, but it has legs extending rearwardly across the chain and supporting rollers 12 which engage the rails. The body of the carriage is provided with a vertical slot 13, in which a crosshead 14 can move up and down. The crosshead can be slidably mounted in the slot or be provided with rollers 15 engaging the sides of the slot. The chain is pivotally connected to this crosshead, such as by a U-shape bracket 16 straddling a pair of adjoining chain links, to which it is fastened, and provided with a pin 17 that extends forward through the crosshead. The pin is journaled in the crosshead. Consequently, as the chain carries the bracket along, it moves the crosshead and frame with it until an end sprocket is reached. Then, as the bracket passes around the sprocket, it moves the crosshead vertically in the carriage slot and then carries the carriage back across the machine to the other end sprocket.

Pivotally connected by a screw 20 to a lower forward projection of the carriage is the lower end of an upwardly extending arm 21. Rigidly mounted on this arm in any suitable manner is a spray gun 22, the nozzle of which points downwardly. The gun is connected by flexible hoses 23 to a source or sources of supply of the material that is to be sprayed from the gun. As mentioned before, this may be polyurethane. To swing the arm as it travels back and forth across the machine, the central portion of a lever 24 is pivotally connected to one side of the carriage by means of a pivot pin 25. One end of this lever is pivotally connected with the chain, most suitably by slidably and rotatably mounting the front end of the bracket pin 17 in a longitudinal slot 26 in the lever, whereby the lever will be oscillated as the pin moves up and down in the carriage slot with the crosshead.

The lever 25 also is operatively connected with arm 21 in order to swing the arm as the lever oscillates. The preferred way of doing this is to pivotally mount the central portion of a bell crank 28 on an upper forward projection of the carriage by means of a screw 29, and to also connect one end of the crank with the free end of the lever by means of link 30 pivotally mounted in holes in those two members. The opposite end of the crank is pivotally connected to arm 21 in such a way that as the crank is turned it will swing the arm. Thus, the back of the upper part of the arm may be provided with a pin 31 that is slidably and rotatably mounted in a longitudinal slot 32 in the adjoining end of the crank. It will be seen in FIGS. 1 and 5 that as crosshead 14 is moved up and down in the slotted carriage by the traveling chain, the angle of arm 21 with the vertical is changed. The angle that the arm and spray gun will have with the vertical during horizontal travel of the crosshead can be changed by adjusting the link along the lever or along the crank or along both. A convenient way of doing this is to provide both the lever and the crank with rows of holes, in any one of which the link can be inserted. This adjustment will give some control over the way the substrate is coated.

Another feature of this invention is that this apparatus can spray some areas of the substrate with a thicker coating than others. This is accomplished by disposing different straight portions of the chain at different angles to the path of travel of the carriage, so that for part of its travel the angle of the spray gun will change continually in order to aim the gun at a given spot or area for a longer period of time than otherwise would be the case. With the arrangement shown in the drawings, the two end sprockets are much smaller than the two intermediate sprockets. The latter have the same diameter so that the lengths of chain between them are parallel. The lower length of the chain is shown extending in a straight line from the right-hand large sprocket 4 to the far end sprocket 2 but from the latter to the top of large sprocket 3 the chain must be inclined, whereby that length of chain is longer than the length directly below it. Therefore, as the carriage is moved to the right between sprockets 2 and 3, it will move more slowly than between the large sprockets, and the spray gun will spray the underlying area of the substrate for a longer period of time. More importantly, however, the inclination of the upper length of chain between sprockets 2 and 3 causes the lever 24 to be turned continually and thereby aim the spray gun at the same area of the substrate for a longer period than when pin 17 is moving horizontally. Part of the substrate will therefore receive a thicker coating than the adjoining part.

From the large sprocket 4 to the adjacent end sprocket 5 the chain is shown inclined downwardly slightly, and then from that end sprocket back to large sprocket 4 the lower length of chain is inclined more sharply. Both of these length of chain therefore tend to keep the spray gun aimed at the same area for a predetermined time, with a resulting increase in the thickness of the underlying spray coating on the substrate.

It will be seen that by adjusting any of the sprockets vertically relative to the others, the thickness of the spray coating can be changed and controlled to suit conditions, even though the chain always travels at a uniform linear speed.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Spray coating apparatus comprising a track, an endless chain extending lengthwise of the track, sprockets supporting the chain, means for driving one of the sprockets at a constant speed, a carriage movable back and forth along the track, means connecting the chain with the carriage for moving the carriage, an arm pivotally supported by the carriage for swinging lengthwise of the track, a spray gun supported by the arm, a lever, a pivot connecting the lever to the carriage, means pivotally connecting said chain with said lever to turn the lever as the position of said pivotally connecting means relative to said pivot changes, and means operatively connecting the lever with said arm to swing the arm as the lever turns.

2. Spray coating apparatus according to claim 1, in which said endless chain has a length traveling toward one end of the track and an opposite length traveling toward the other end of the track, and different straight portions of at least one of said chain lengths are disposed at different angles to the path of travel of said carriage, whereby said lever will be turned as the carriage is moved along the track.

3. Spray coating apparatus according to claim 1, in which at least one of said sprockets is adjustable relative to the adjacent sprocket to change the angle of the chain between them.

4. Spray coating apparatus according to claim 1, in which there are at least three sprockets, and at least one of the end sprockets has a smaller diameter than an intermediate sprocket.

5. Spray coating apparatus according to claim 1, in which there are two end sprockets and two intermediate sprockets of larger diameter than the end sprockets, and the intermediate sprockets have substantially the same diameter.

6. Spray coating apparatus according to claim 1, in which said lever is provided with a longitudinal slot, and said pivotal connecting means slides in said slot.

7. Spray coating apparatus according to claim 1, in which said last-mentioned means includes a bell crank having a central portion pivotally connected to said carriage, a link pivotally connecting one end of the crank to said lever, and means pivotally connecting the opposite end of the crank with said arm.

8. Spray coating apparatus according to claim 7, in which the ends of said link are adjustable along said crank and lever.

References Cited

UNITED STATES PATENTS 2,840,038   6/1958   Verba _____ 118—323

CHARLES A. WILLMUTH, *Primary Examiner.*

JOHN P. McINTOSH, *Assistant Examiner.*